(12) United States Patent
Chen (10) Patent No.: US 11,313,425 B2
(45) Date of Patent: Apr. 26, 2022

(54) MOTOR TRANSMISSION UNIT FOR ELECTRONIC PARKING BRAKE DEVICE

(71) Applicant: KEMA ENTERPRISE CO., LTD., Taichung (TW)

(72) Inventor: Chung-Hao Chen, Taichung (TW)

(73) Assignee: KEMA ENTERPRISE CO., LTD., Taichung (TW)

( * ) Notice: Subject to any disclaimer, the term of this patent is extended or adjusted under 35 U.S.C. 154(b) by 65 days.

(21) Appl. No.: 16/927,070

(22) Filed: Jul. 13, 2020

(65) Prior Publication Data
US 2022/0010851 A1 Jan. 13, 2022

(51) Int. Cl.
| | |
|---|---|
| F16D 55/08 | (2006.01) |
| F16D 65/18 | (2006.01) |
| B60T 13/74 | (2006.01) |
| F16D 125/70 | (2012.01) |
| F16D 121/24 | (2012.01) |
| F16D 55/00 | (2006.01) |
| F16D 125/40 | (2012.01) |

(52) U.S. Cl.
CPC ............ F16D 65/18 (2013.01); B60T 13/741 (2013.01); *F16D 2055/0066* (2013.01); *F16D 2055/0091* (2013.01); *F16D 2121/24* (2013.01); *F16D 2125/40* (2013.01); *F16D 2125/70* (2013.01)

(58) Field of Classification Search
CPC ................ B60T 13/741; F16D 55/228; F16D 2055/0091; F16D 2055/0066; F16D 2121/24; F16D 2125/40; F16D 2125/36
See application file for complete search history.

(56) References Cited

U.S. PATENT DOCUMENTS

| | | | |
|---|---|---|---|
| 9,850,971 B1* | 12/2017 | Demorais | F16D 55/226 |
| 2009/0133975 A1* | 5/2009 | Gilles | B60T 13/741 188/72.6 |
| 2015/0267767 A1* | 9/2015 | Liao | B60T 13/741 188/72.1 |
| 2017/0130788 A1* | 5/2017 | Noguchi | F16D 55/226 |
| 2017/0335908 A1* | 11/2017 | Liao | B60T 13/741 |
| 2018/0031060 A1* | 2/2018 | Huang | B60T 13/588 |
| 2018/0058524 A1* | 3/2018 | Suzuki | F16D 65/183 |
| 2018/0245645 A1* | 8/2018 | Thomas | F16D 65/18 |
| 2019/0118789 A1* | 4/2019 | Bourlon | B60T 13/741 |
| 2019/0331180 A1* | 10/2019 | Chelaidite | F16H 25/24 |
| 2019/0383336 A1* | 12/2019 | Noguchi | F16D 55/228 |

* cited by examiner

*Primary Examiner* — Nicholas J Lane
(74) *Attorney, Agent, or Firm* — Guice Patents PLLC (57) ABSTRACT

A motor transmission unit for an electronic parking brake device includes a case, a driving member, a board, a rod and a push unit. The case is slidably mounted to a cap of a clamp. The driving member is partially inserted into the case. The board is threadedly mounted to the driving member. The rod is located between inner periphery of the passage and the board. The push unit has a first end thereof contacting the first end face, and a second end of the push unit is inserted in the clamp. A portion of the second end of the push unit contacts a piston. When the driving member is driven, the board moves axially. The board is restricted by the rod and does not rotate. The board pushes the push unit axially which moves the piston to push a lining plate of the clamp to contact a brake disk.

2 Claims, 14 Drawing Sheets

MOTOR TRANSMISSION UNIT FOR ELECTRONIC PARKING BRAKE DEVICE

BACKGROUND OF THE INVENTION

1. Fields of the Invention

The present invention relates to a motor transmission unit for an electronic parking brake device for vehicles.

2. Descriptions of Related Art

The conventional motor transmission unit for vehicle electronic parking brake device is disclosed in TW 104214409 and includes a motor whose output shat is co-rotatably connected with a pivotal transmission shaft to drive an eccentric shaft. The eccentric end of the eccentric shaft is located in and restricted by a recess of a push rod, so that when the transmission shaft drives the eccentric shaft, the eccentric shaft can only move toward a direction away from the transmission shaft such that the eccentric shaft does not co-rotated with the transmission shaft. The push rod pushes the first lining plate and contacts one side of the brake disk. Because the eccentric shaft moves toward the direction away from the transmission shaft, the distance between the eccentric shaft and the transmission shaft increases, and the transmission shaft drives the cap toward a direction away from the first lateral part, such that the guide board of the cap moves and push the second lining plate to contact the other side of the brake disk to complete electronic parking action by the motor.

However, when the eccentric shaft is driven by the transmission, the eccentric end has to continuously contact against the inside of the recess of the push rod so as to ensure that the eccentric rod does not rotate and to move linearly relative to the transmission shaft. During the action, the eccentric rod cannot avoid from slightly shaking and swinging. The eccentric rod also applies a force to the seal ring during the shanking and swinging action, and this reduces the life of the seal ring which tends to be deformed quickly. The brake oil may leak from the deformed seal ring.

The present invention intends to provide a motor transmission unit for an electronic parking brake device for vehicles to eliminate shortcomings mentioned above.

SUMMARY OF THE INVENTION

The present invention relates to a motor transmission unit for an electronic parking brake device, and comprises case, a driving member, a board, a rod and a push unit. The case is slidably mounted to a cap of a clamp. The case includes a passage which opens toward the cap. The driving member is inserted into the case and partially located in the passage of the case. The board is threadedly mounted to the driving member and located in the passage. The board includes a first end face and a second end face, wherein the first end face faces the passage. The rod is located between the inner periphery of the passage and the board. The push unit includes a first end thereof contacting the first end face, and a second end of the push unit is inserted in the clamp. A seal ring is mounted to the push unit. A portion of the second end of the push unit is located in a chamber of the clamp and contacts a piston.

When the driving member is driven, the board moves axially along the driving member and toward the clamp. The board is restricted by the rod and does not rotate. The first end face of the board pushes the push unit which moves axially and moves the piston to push a lining plate of the clamp to contact a brake disk.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the show the motor transmission unit 100 for an electronic parking brake device of the present invention comprises a case 300, a driving member 400, a board 500, a rod 600 and a push unit 700.

The case 300 is slidably mounted to the left side 209 of a cap 201 of a clamp 200. The case 300 includes a passage 301 which opens toward the cap 201. The driving member 400 is inserted into the case 300 and partially located in the passage 301 of the case 300. The board 500 is threadedly mounted to the driving member 400 and located in the passage 301. The board 500 includes a first end face 501 and a second end face 504 which is located opposite to the first end face 501. The first end face 501 faces the passage 301. The rod 600 is located between the inner periphery of the passage 301 and the board 500. The push unit 700 includes a first end thereof contacting the first end face 501, and a second end of the push unit 700 is inserted in the clamp 200. A seal ring 202 is mounted to the push unit 700. A portion of the second end of the push unit 700 is located in a chamber 203 of the clamp 200 and contacts a piston 204.

When the driving member 400 is driven and rotated by a force (as shown by arrow head in FIG. 5), the board 500 moves axially along the driving member 400 and toward the clamp 200. The board 500 is restricted by the rod 600 and does not rotate. The first end face 501 of the board 500 pushes the push unit 700 which moves axially and moves the piston 204 to push a lining plate 205 of the clamp 200 to contact a brake disk 206.

Figure 5:
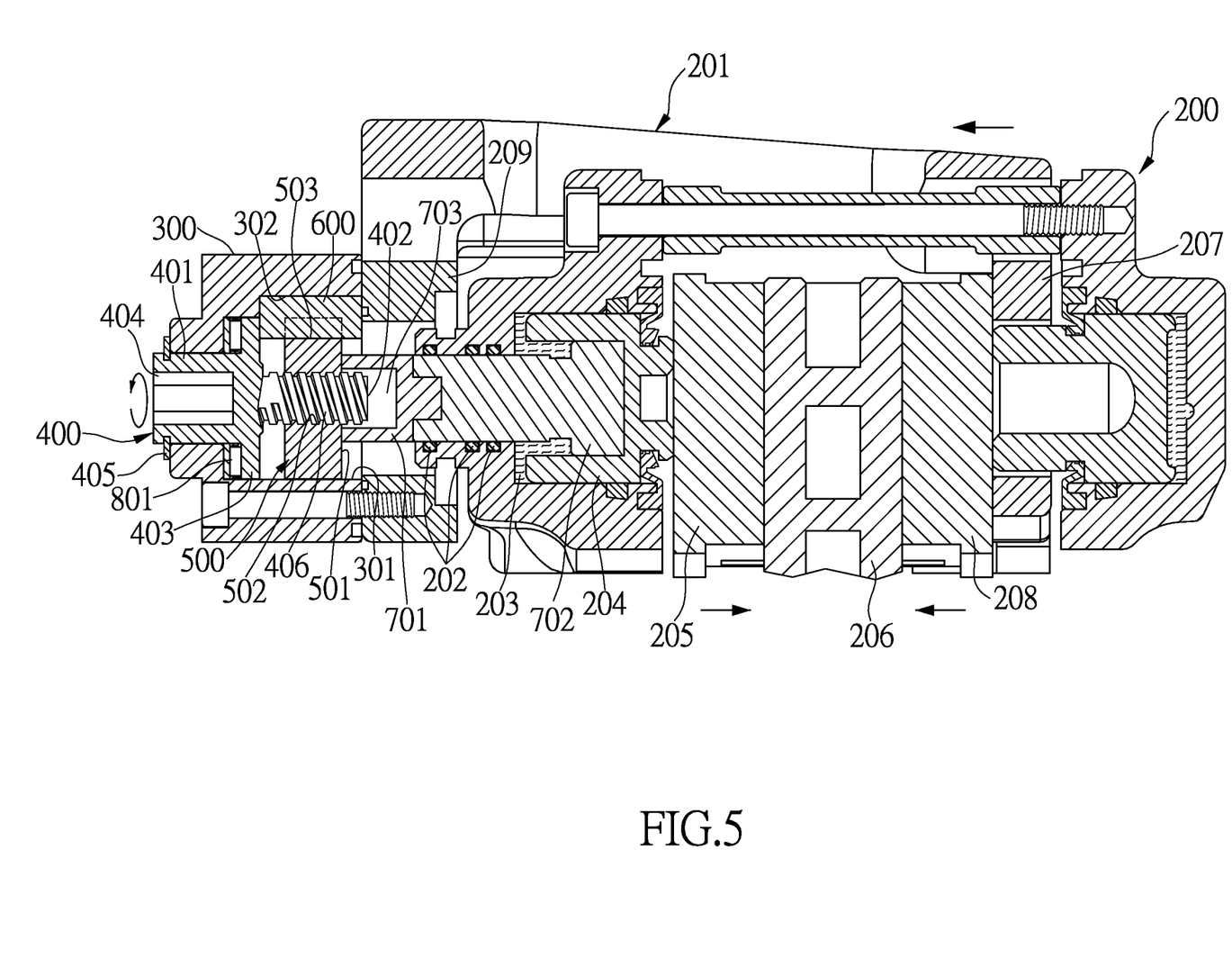
FIG. 5 shows is a cross sectional view to show the motor transmission unit when the driving member is driven by a force.

The board 500 is restricted by the rod 600 so that the board 500 can only move along the driving member 400 and does not rotate. Therefore, the board 500 directly pushes the push unit 700 to move axially, and the push unit 700 pushes the lining plate 205 of the clamp 200 to contact the brake disk 206 to stop the vehicle. Because the push unit 700 does not rotate and swing, so that the seal ring 202 is not deformed and twisted to achieve the purpose of the present invention. The push unit 700 is moved by the driving member 400 so that the driving member 400 drives the cap 201 to move toward the left side in the drawing, and the right side 207 of the cap 201 pushes the lining plate 208 to contact the brake disk 206 to park the vehicle. When the motor is operated to rotate in opposite direction, the brake action is released.

Figure 1:
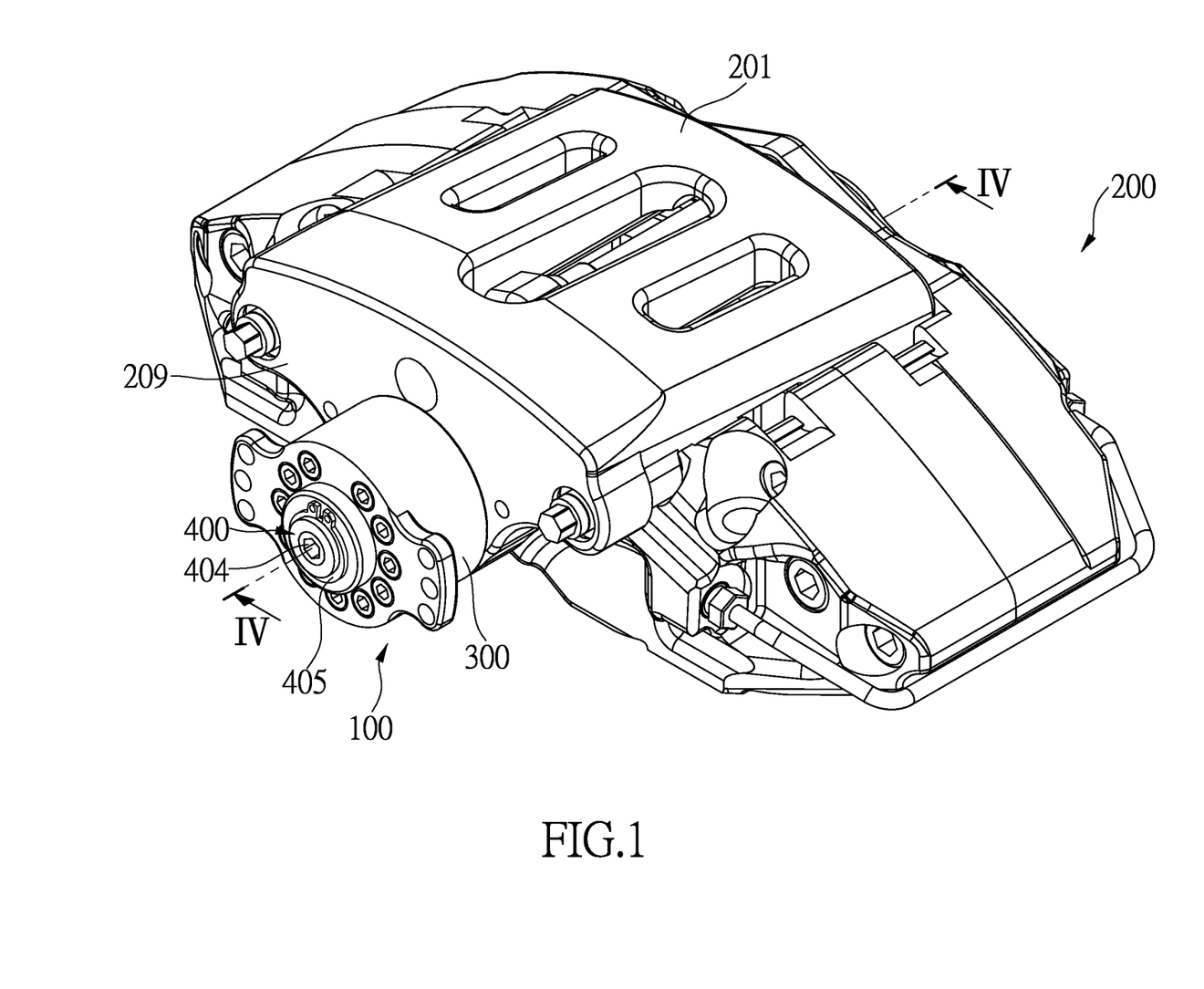
FIG. 1 is a perspective view to show the motor transmission unit for an electronic parking brake device of the present invention.
Figure 2:
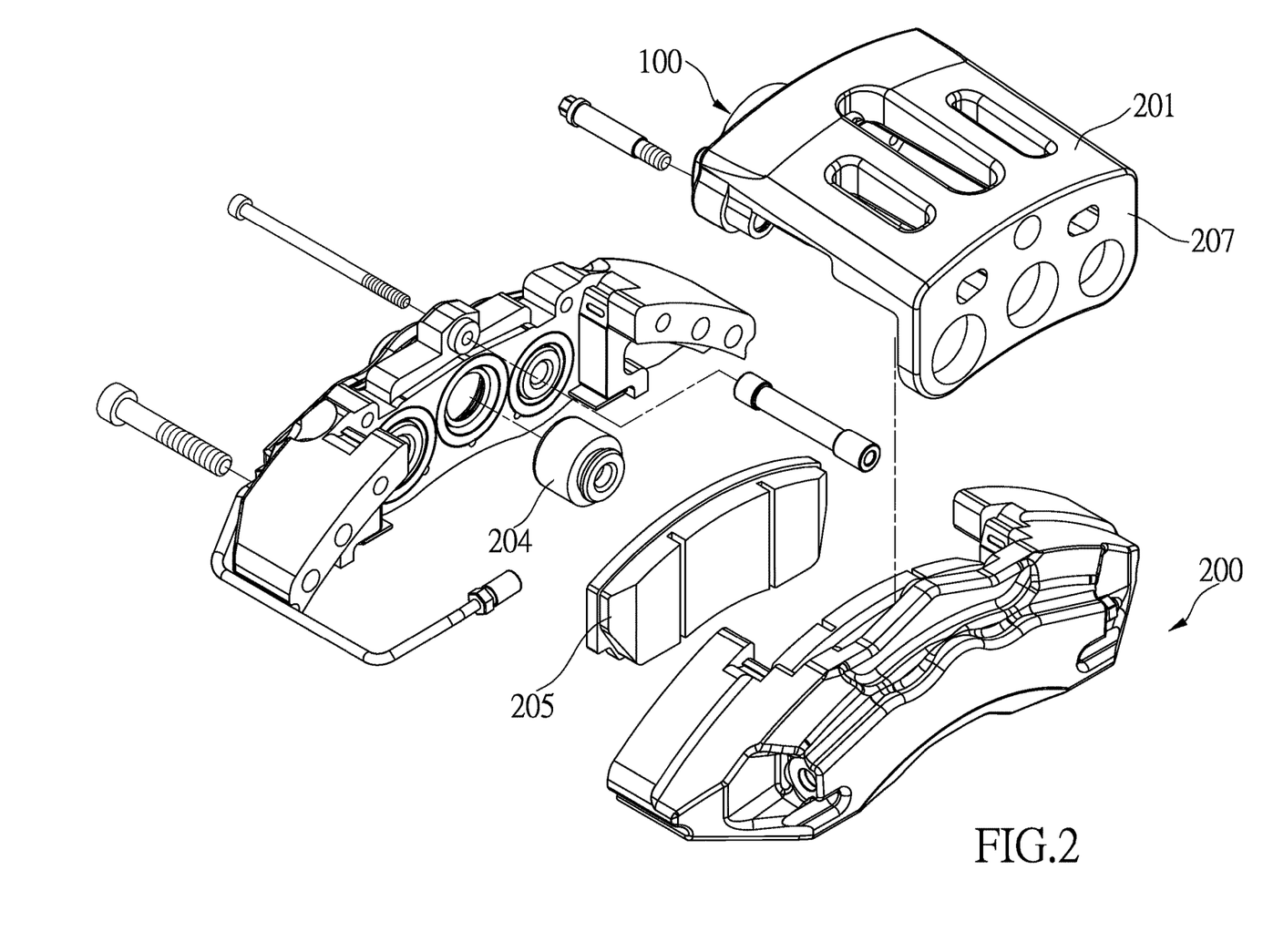
FIG. 2 shows the motor transmission unit, the clamp, the cap and the piston and the lining plate of the present invention.
Figure 3:
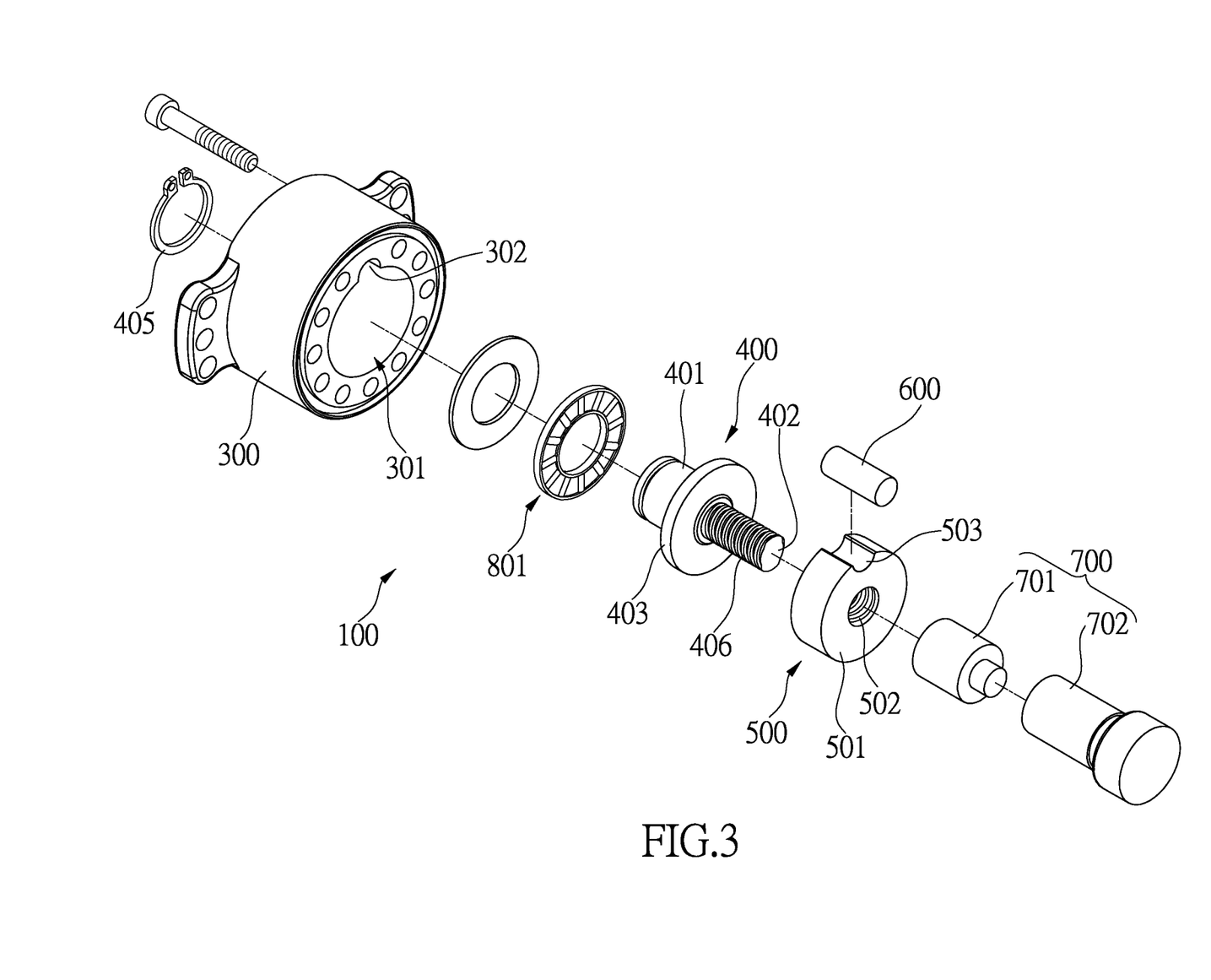
FIG. 3 is an exploded view of the motor transmission unit for an electronic parking brake device of the present invention.
Figure 4:
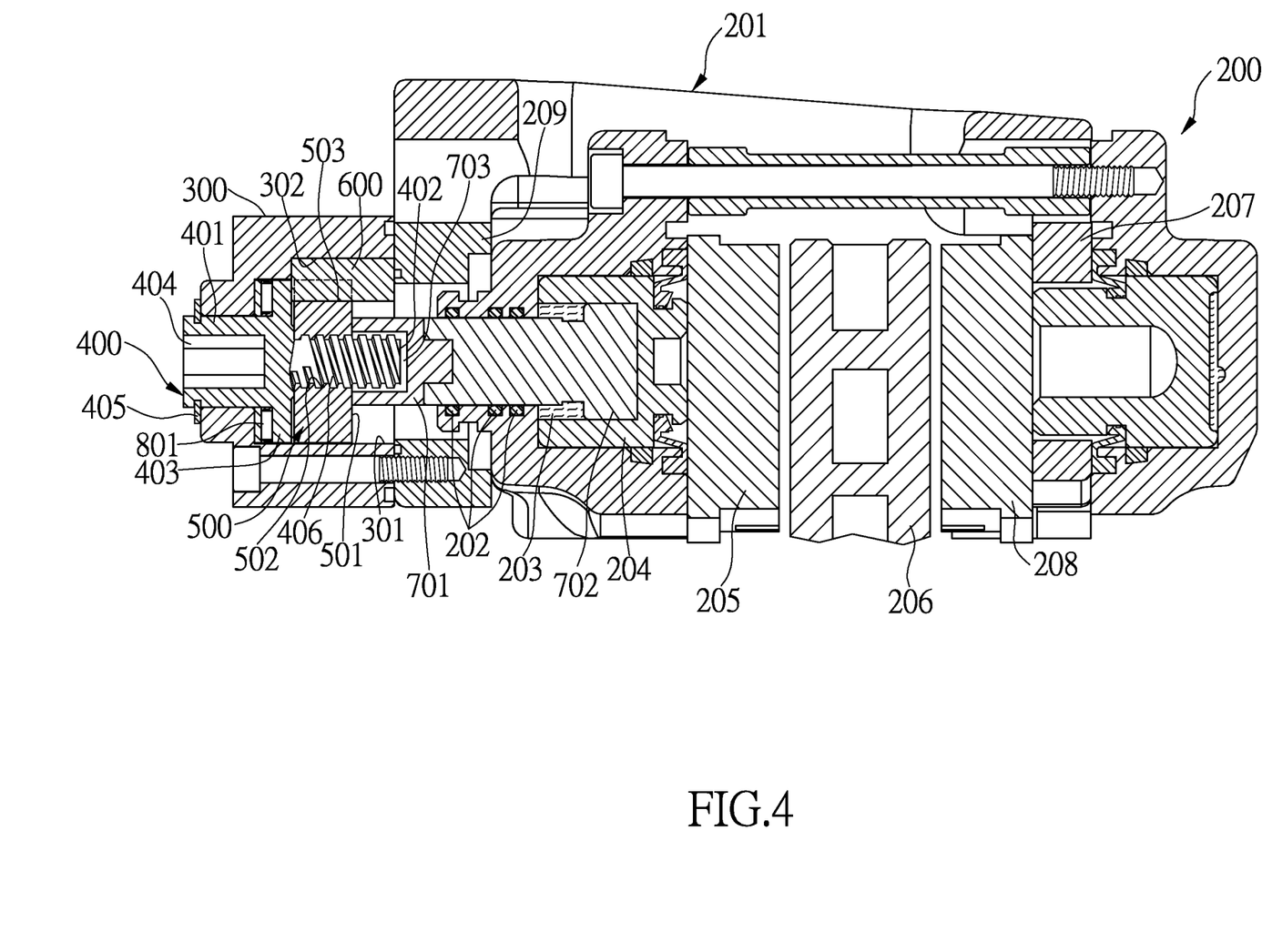
FIG. 4 is a cross sectional view, taken along line Iv-Iv in FIG. 1.

Specially, the driving member 400 includes a first section 401 and a second section 402, and a flange 403 is located between the first and second sections 401, 402. The first section 401 extends through the case 300. The flange 403 is located in the passage 301. The board 500 is threadedly connected to the second section 402. The diameter of the flange 403 is larger than that of each of the first and second sections 401, 402. The flange 403 prevents the driving member 400 from dropping from the passage 301. The first section 401 includes a recess 404 to which an output shaft of a motor (both not shown) is connected. A clip 405 is mounted to outside of the first section 401 to restrict the driving member 400 from dropping from the passage 301.

The second section 402 of the driving member 400 includes outer threads 406 defined in the outer periphery thereof. The board 500 includes inner threads 502 which are threadedly connected to the outer threads 406. It is noted that the outer threads 406 and the inner threads 502 both have double threads so that the board 500 can move fast.

Furthermore, a needle roller thrush bearing 801 is mounted to the first section 401 of the driving member 40. The needle roller thrush bearing 801 is located between the inner periphery of the passage 301 and the flange 403. The needle roller thrush bearing 801 avoids the flange 403 from contacting the inner periphery of the passage 301 so that the flange 403 rotates smoothly.

A first slot 302 is defined in the inner periphery of the passage 301. A second slot 503 is defined in the outer periphery of the board 500, so that the rod 600 is accommodated between the first and second slots 302, 503. The rod 600 is a round cylindrical rod, and the first and second slots 302, 503 form a space which is shaped to accommodate the rod 600. Therefore, the rod 600 keeps the board 500 to move axially and does not rotate.

The push unit 700 includes a first part 701 and a second part 702 which is connected to the first part 701. The first part 701 contacts the first end face 501, and the second part 702 contacts the piston 204. The seal ring 200 of the clamp 200 is mounted to the second part 702. The first part 701 and the second part 702 are connected in a protrusion-and-recess pattern. The first part 701 includes a room 703 defined in an end thereof which contacts the first end face 501 of the board 500. The second section 402 does not contact the inside of the room 703.

Figure 6:
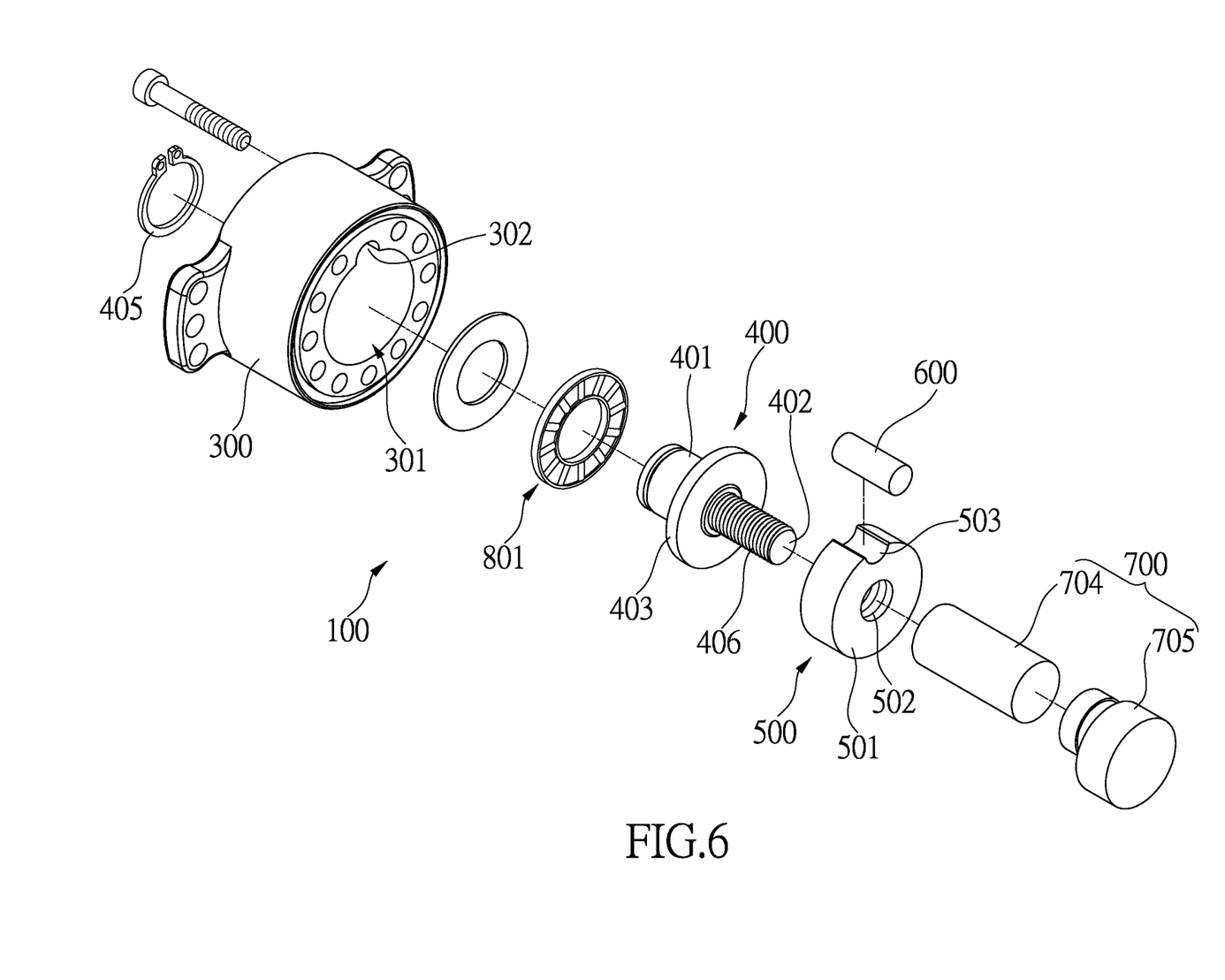
FIG. 6 an exploded view of the second embodiment of the motor transmission unit for an electronic parking brake device of the present invention.
Figure 7:
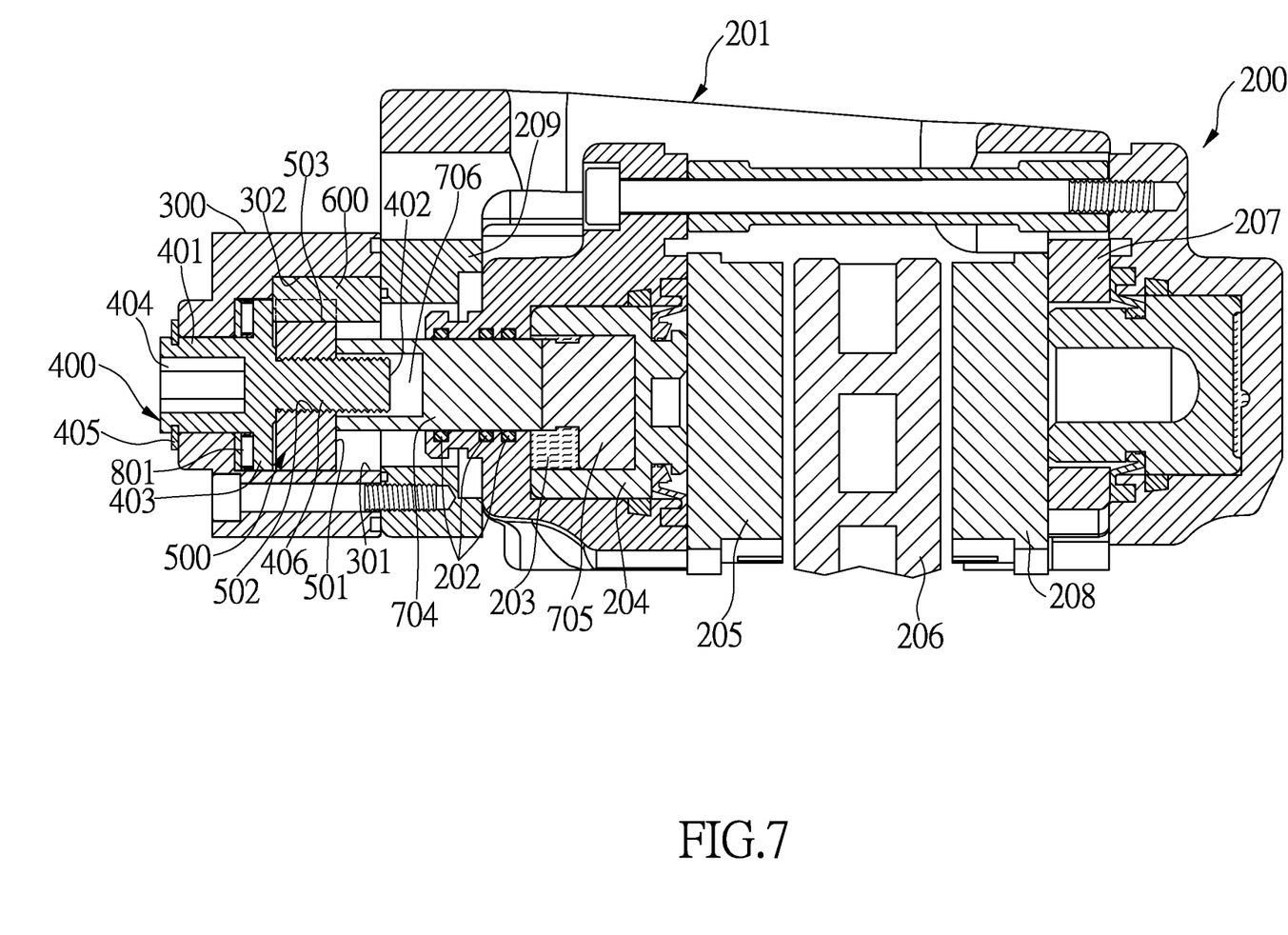
FIG. 7 is a cross sectional view of the second embodiment of the motor transmission unit for an electronic parking brake device of the present invention.
Figure 8:
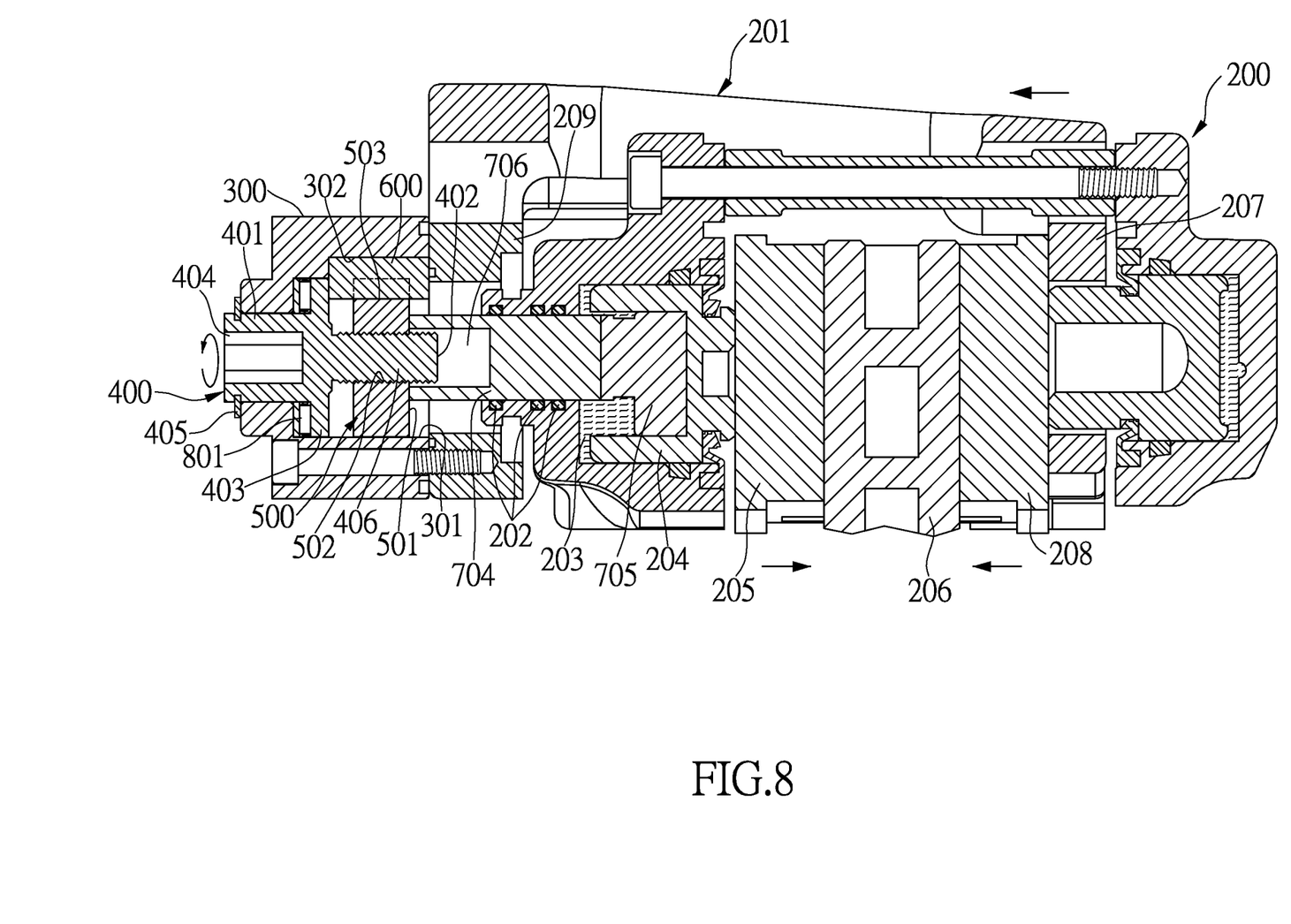
FIG. 8 shows is a cross sectional view to show the motor transmission unit when the driving member of the second embodiment is driven by a force.

As shown in FIGS. 6 to 8, the second embodiment is disclosed, wherein the push unit 700 includes a shank 704 and a head 705 which is formed to the shank 704. The seal ring 202 of the clamp 200 is mounted to the shank 704, and the head 705 contacts the piston 204. The shank 704 and the head 705 are two individual parts and are connected each other by any known method such as welding. The head 705 is eccentrically located relative to the shank 704. The shank 704 includes a room 706 defined in the distal end opposite to the head 705. The distal end of the shank 704 contacts the first end face 501 of the board 500. The second section 402 of the driving member 400 is located in the room 706 of the shank 704 and is not in contact with an inside of the room 706.

Figure 9:
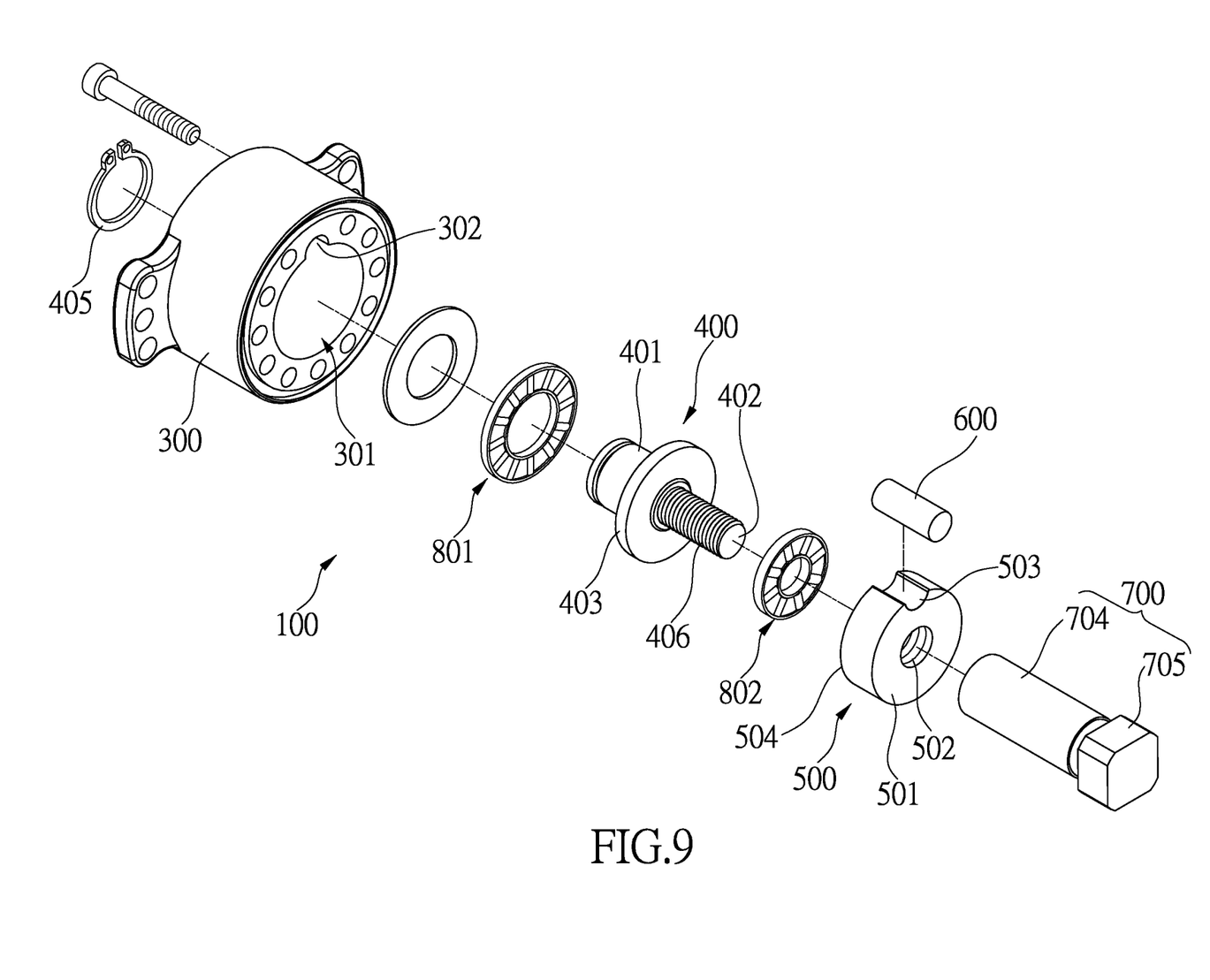
FIG. 9 an exploded view of the third embodiment of the motor transmission unit for an electronic parking brake device of the present invention.
Figure 10:
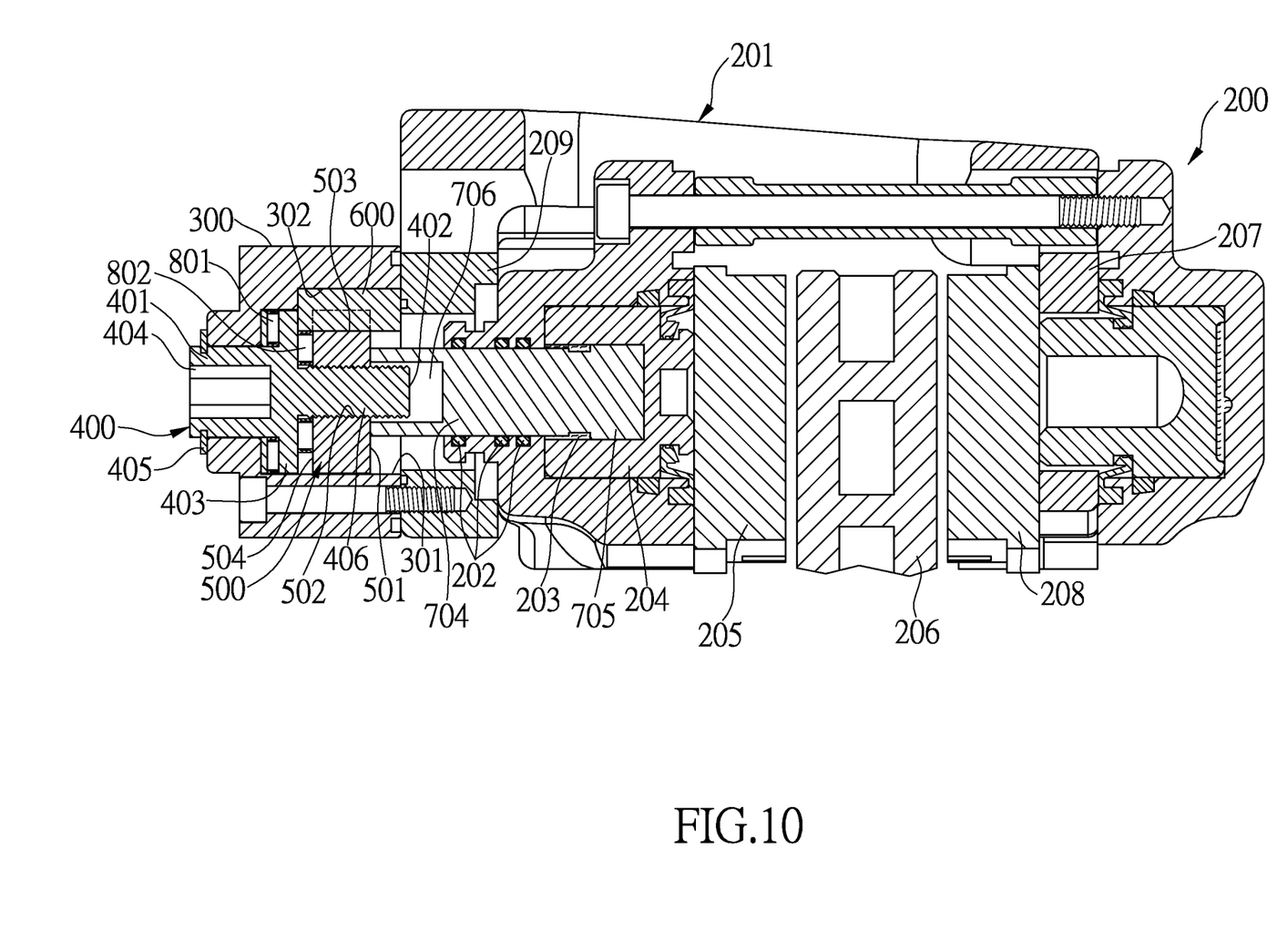
FIG. 10 is a cross sectional view of the third embodiment of the motor transmission unit for an electronic parking brake device of the present invention.
Figure 11:
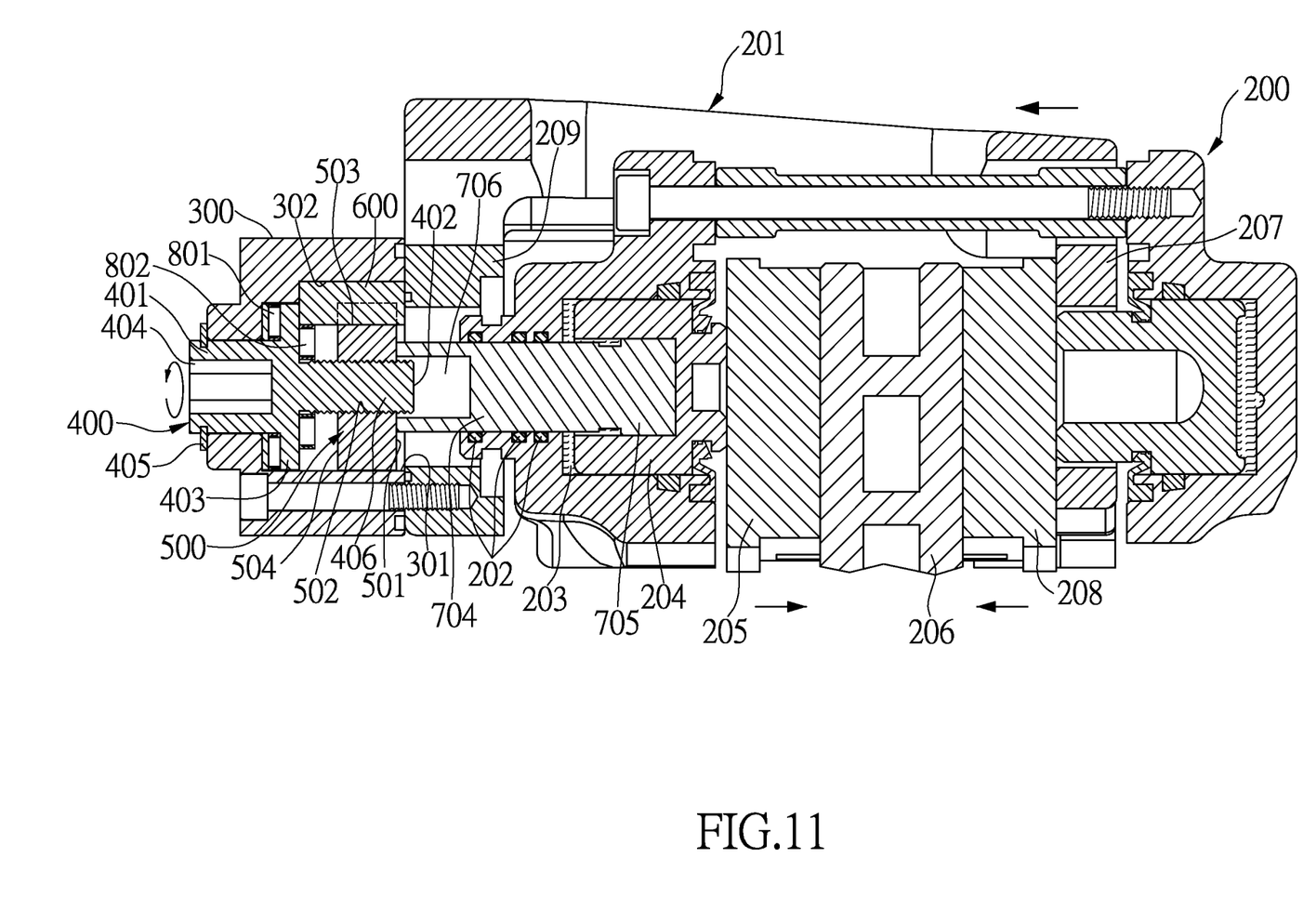
FIG. 11 shows is a cross sectional view to show the motor transmission unit when the driving member of the third embodiment is driven by a force.

As shown in FIGS. 9 to 11, the third embodiment is disclosed, the difference between the second and the third embodiments is that the head 705 is co-axially located relative to the shank 704. Another needle roller thrush bearing 802 is mounted to the second section 402 of the driving member 40. The another needle roller thrush bearing 802 is located between the second end face 504 of the board 500 and the flange 403. The board 500 and the driving member 400 are threadedly connected to each other, and the threads of the board 500 and the driving member 400 are single thread.

Figure 12:
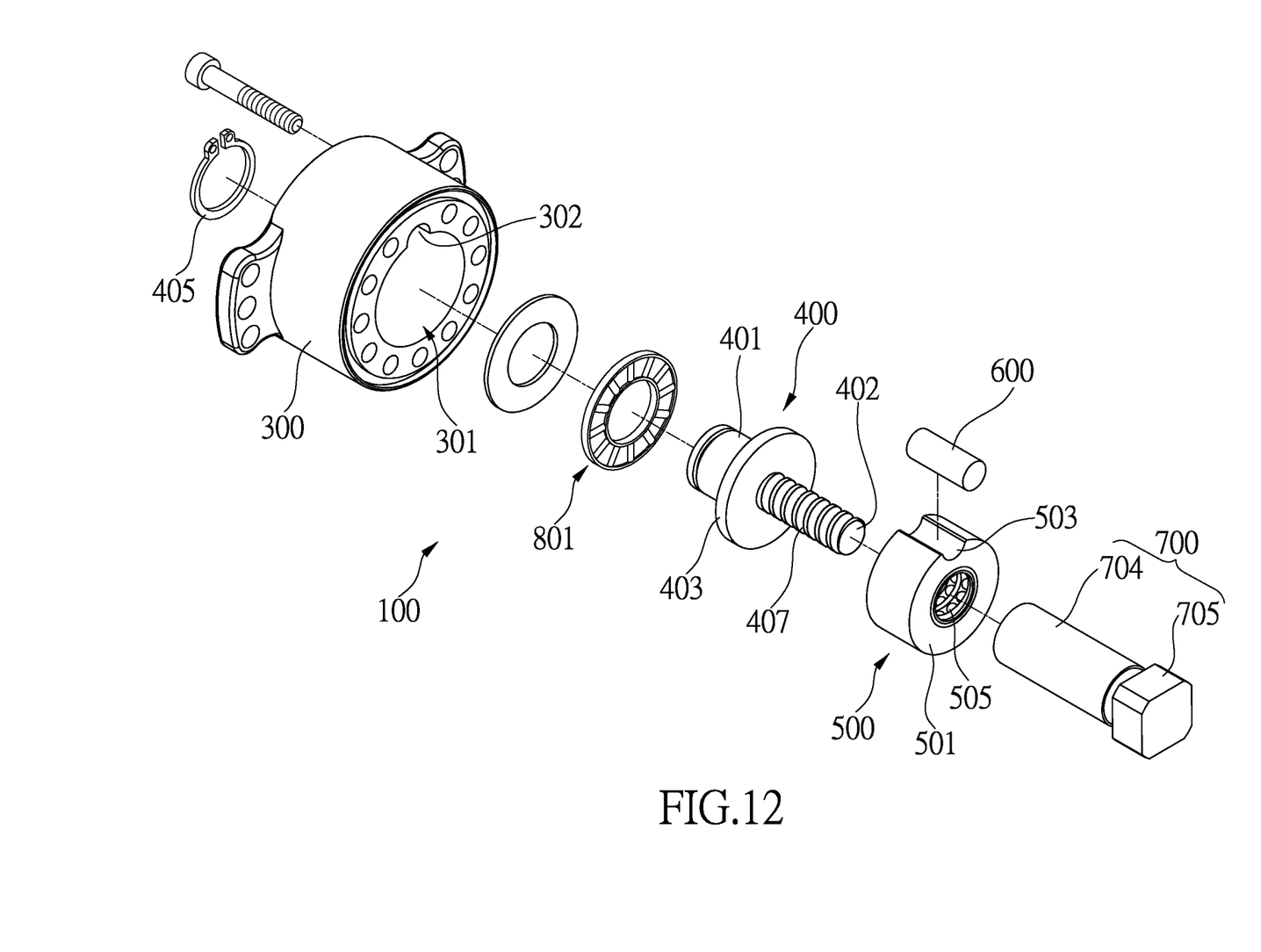
FIG. 12 an exploded view of the fourth embodiment of the motor transmission unit for an electronic parking brake device of the present invention.
Figure 13:
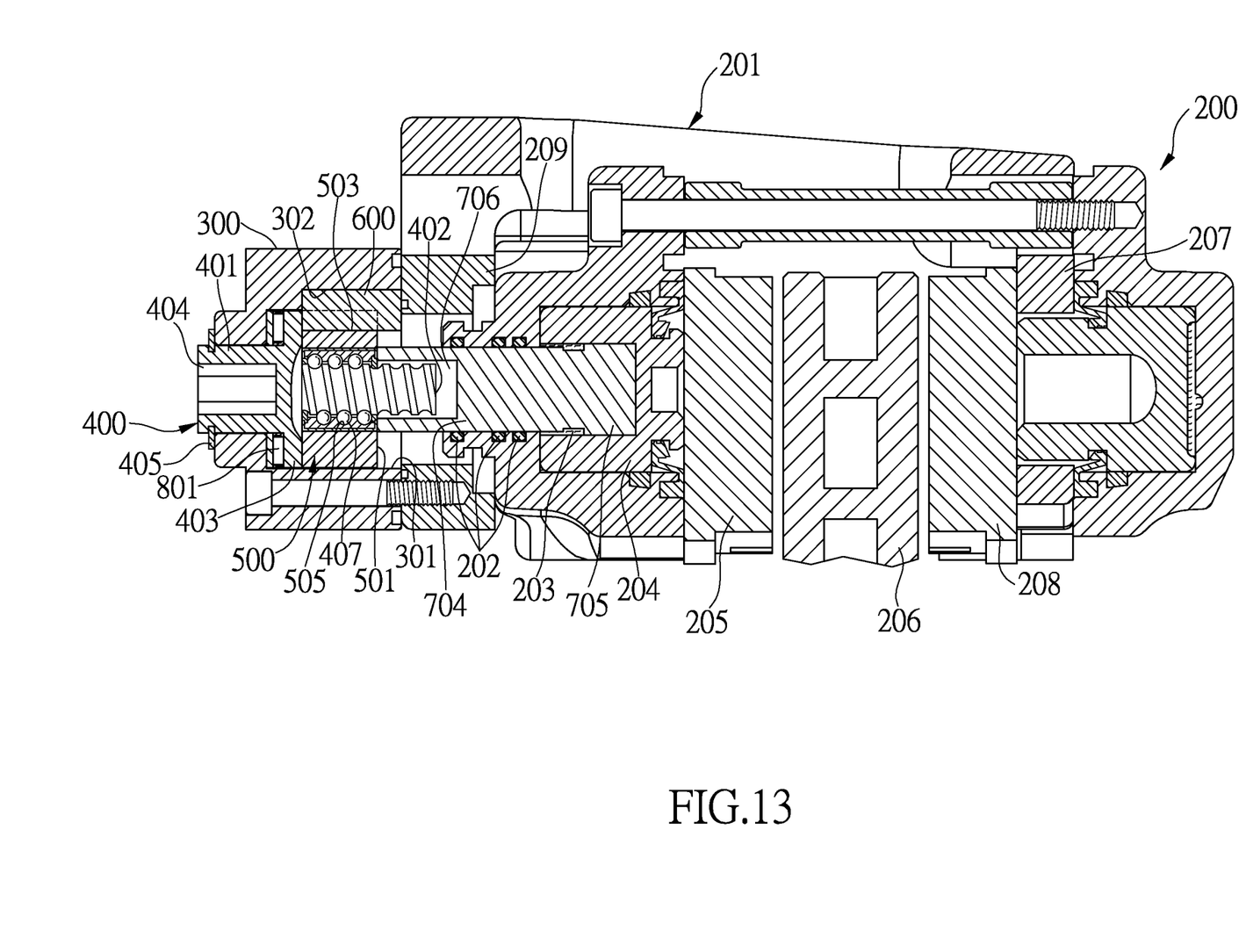
FIG. 13 is a cross sectional view of the fourth embodiment of the motor transmission unit for an electronic parking brake device of the present invention.
Figure 14:
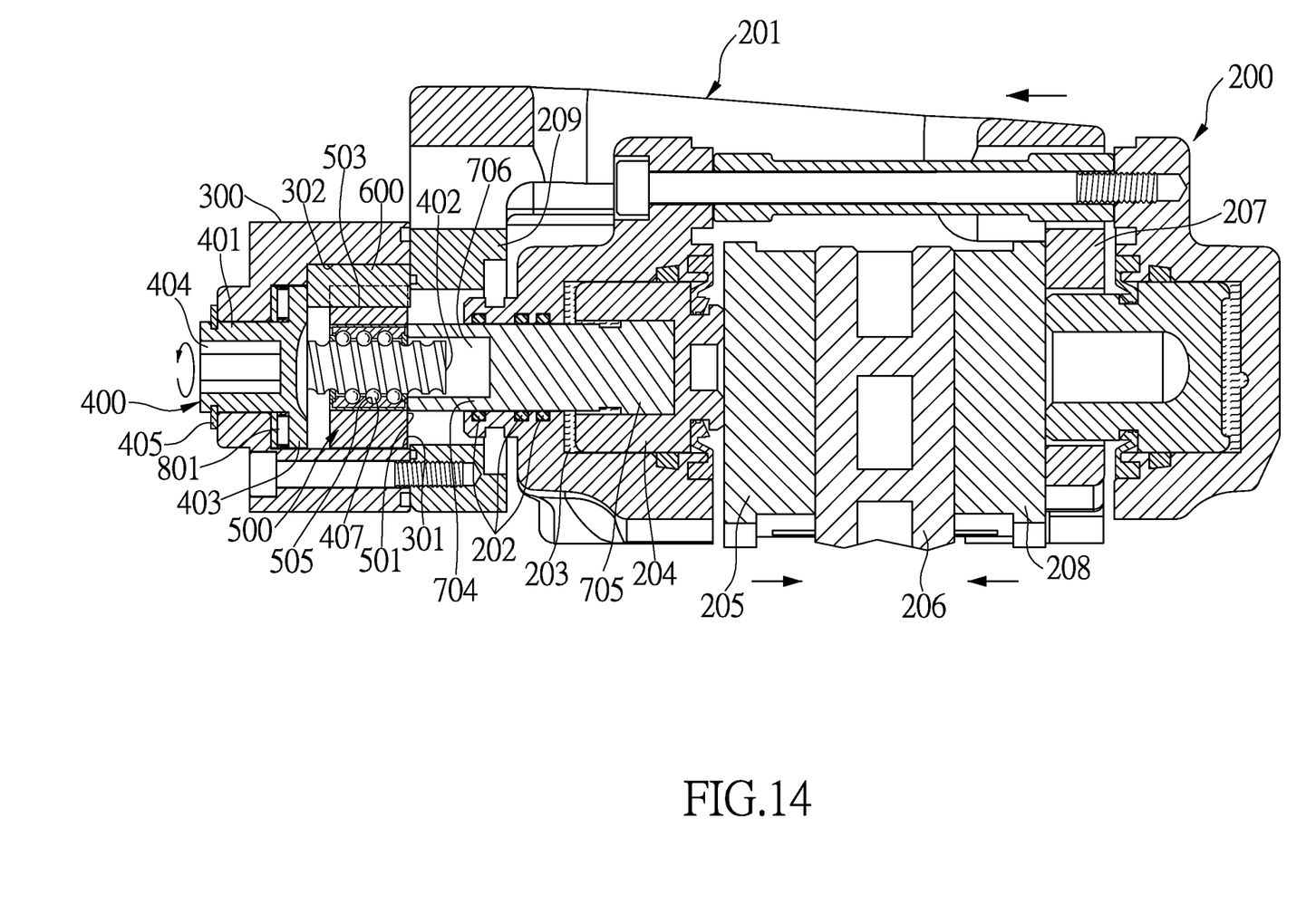
FIG. 14 shows is a cross sectional view to show the motor transmission unit when the driving member of the fourth embodiment is driven by a force.

As shown in FIGS. 12 to 14, the fourth embodiment is disclosed, the difference between the third and the fourth embodiments is that the second section 402 of the driving member 400 includes a groove 407 spirally defined in the outer periphery thereof. The board 500 includes balls 505 which are movably received in the groove 407.

While we have shown and described the embodiment in accordance with the present invention, it should be clear to those skilled in the art that further embodiments may be made without departing from the scope of the present invention.

What is claimed is:

1. A motor transmission unit for an electronic parking brake device, comprising:
   a case slidably mounted to a cap of a clamp, the case having a passage which opens toward the cap;
   a driving member inserted into the case and partially located in the passage of the case, the driving member including a first section and a second section, a flange located between the first and second sections, the first section extending through the case, the flange located in the passage, a board threadedly connected to the second section;
   the board threadedly connected to the second section of the driving member and located in the passage, the board having a first end face and a second end face, the first end face facing the passage;
   a rod located between an inner periphery of the passage and the board, and
   a push unit having a first end thereof contacting the first end face, a second end of the push unit inserted in the clamp, a seal ring mounted to the push unit, a portion of the second end of the push unit located in a chamber of the clamp and contacting a piston, a needle roller thrust bearing mounted to the second section of the driving member, and located between the second end face of the board and the flange, the first and second end faces located opposite to each other, when the driving member is driven, the board moves axially along the driving member and toward the clamp, the board is restricted by the rod and does not rotate, the first end face of the board pushes the push unit which moves axially and moves the piston to push a lining plate of the clamp to contact a brake disk.

2. A motor transmission unit for an electronic parking brake device, comprising:
  a case slidably mounted to a cap of a clamp, the case having a passage which opens toward the cap;
  a driving member inserted into the case and partially located in the passage of the case;
  a board threadedly mounted to the driving member and located in the passage, the board having a first end face and a second end face, the first end face facing the passage;
  a rod located between an inner periphery of the passage and the board, and
  a push unit having a first end thereof contacting the first end face, a second end of the push unit inserted in the clamp, a seal ring mounted to the push unit, a portion of the second end of the push unit located in a chamber of the clamp and contacting a piston, the push unit including a first part and a second part which is connected to the first part, the first part contacting the first end face, the second part contacting the piston, the seal ring of the clamp mounted to the second part, the first part and the second part connected in a protrusion-and-recess pattern, the first part including a room defined in an end thereof which contacts the first end face of the board, when the driving member is driven, the board moves axially along the driving member and toward the clamp, the board is restricted by the rod and does not rotate, the first end face of the board pushes the push unit which moves axially and moves the piston to push a lining plate of the clamp to contact a brake disk.

* * * * *